United States Patent
Finkenzeller

(10) Patent No.: US 10,781,869 B2
(45) Date of Patent: Sep. 22, 2020

(54) FRICTION CLUTCH HAVING A ROTATIONAL AXIS

(71) Applicant: Schaeffler Technologies AG & Co. KG, Herzogenaurach (DE)

(72) Inventor: Marc Finkenzeller, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 219 days.

(21) Appl. No.: 15/770,285

(22) PCT Filed: Nov. 16, 2016

(86) PCT No.: PCT/DE2016/200521
§ 371 (c)(1),
(2) Date: Apr. 23, 2018

(87) PCT Pub. No.: WO2017/084667
PCT Pub. Date: May 26, 2017

(65) Prior Publication Data
US 2018/0313414 A1 Nov. 1, 2018

(30) Foreign Application Priority Data

Nov. 16, 2015 (DE) .................. 10 2015 222 573
Dec. 17, 2015 (DE) .................. 10 2015 225 615

(51) Int. Cl.
*F16D 47/04* (2006.01)
*B60K 6/387* (2007.10)
(Continued)

(52) U.S. Cl.
CPC .............. *F16D 47/04* (2013.01); *B60K 6/383* (2013.01); *B60K 6/387* (2013.01); *B60K 6/40* (2013.01);
(Continued)

(58) Field of Classification Search
CPC .......... F16D 13/04; F16D 13/40; F16D 13/42; F16D 13/46; F16D 13/48; F16D 13/52;
(Continued)

(56) References Cited

U.S. PATENT DOCUMENTS 5,691,588 A * 11/1997 Lutz ................. B60K 6/387
310/92
6,026,944 A * 2/2000 Satou .................. F16D 13/52
192/70.2

(Continued)

FOREIGN PATENT DOCUMENTS

CN 102549287 A 7/2012
CN 103842231 A 6/2014
(Continued)

OTHER PUBLICATIONS

International Search Report for PCT/DE2016/200521; 3 pgs; dated Mar. 27, 2017 by European Patent Office.

*Primary Examiner* — Richard M Lorence
(74) *Attorney, Agent, or Firm* — Kevin Parks

(57) ABSTRACT

A friction clutch for releasable transmission of a torque between a first drive unit and a second drive unit includes a rotational axis, a friction package for transmitting the torque in a pressed state, a first actuating element, and a second actuating element. The friction package has at least one friction plate and at least one friction disk. The first actuating element is arranged on a first side of the friction package for pressing the friction package in a first axial actuating direction to achieve the pressed state, and the second actuating element is arranged on a second side of the friction package, opposite the first side, for pressing the friction package in a second axial actuating direction, opposite the first axial actuating direction, to achieve the pressed state.

12 Claims, 2 Drawing Sheets

(51) Int. Cl.
  *F16D 13/52* (2006.01)
  *F16D 13/58* (2006.01)
  *F16D 13/46* (2006.01)
  *F16D 13/48* (2006.01)
  *F16D 13/40* (2006.01)
  *B60K 6/48* (2007.10)
  *B60K 6/40* (2007.10)
  *B60K 6/383* (2007.10)
  *F16D 23/12* (2006.01)

(52) U.S. Cl.
  CPC .............. *B60K 6/48* (2013.01); *F16D 13/40* (2013.01); *F16D 13/46* (2013.01); *F16D 13/48* (2013.01); *F16D 13/52* (2013.01); *F16D 13/583* (2013.01); *F16D 13/585* (2013.01); *F16D 23/12* (2013.01); *B60K 2006/4825* (2013.01); *B60Y 2200/92* (2013.01); *B60Y 2400/424* (2013.01); *F16D 2023/123* (2013.01); *F16D 2500/1066* (2013.01)

(58) Field of Classification Search
  CPC .......... F16D 13/54; F16D 13/69; F16D 47/04; B60K 6/383; B60K 6/387; B60K 6/40; B60K 6/48; B60K 2006/4825
  USPC .................................................. 192/70.28, 83
  See application file for complete search history.

(56) References Cited

U.S. PATENT DOCUMENTS

| | | | |
|---|---|---|---|
| 6,910,563 B2* | 6/2005 | Maimone | B62M 25/00 192/105 B |
| 9,677,622 B2* | 6/2017 | Mordukhovich | F16D 13/46 |
| 2013/0231836 A1 | 9/2013 | Moseler | |

FOREIGN PATENT DOCUMENTS

| | | |
|---|---|---|
| CN | 103987983 A | 8/2014 |
| CN | 103998811 A | 8/2014 |
| CN | 104053922 A | 9/2014 |
| CN | 106715942 A | 5/2017 |
| CN | 108138859 A | 6/2018 |
| DE | 102013210451 A1 | 12/2013 |
| DE | 10 2012 219697 A1 | 4/2014 |
| DE | 102013216268 A1 | 4/2014 |
| DE | 102014209047 A1 | 12/2014 |
| EP | 0706463 A1 | 4/1996 |
| EP | 2789870 A1 | 10/2014 |
| WO | 9501885 A1 | 1/1995 |

* cited by examiner

FRICTION CLUTCH HAVING A ROTATIONAL AXIS

CROSS-REFERENCE TO RELATED APPLICATIONS

This application is the United States National Phase of PCT Appln. No. PCT/DE2016/200521 filed Nov. 16, 2016, which claims priority to German Application Nos. DE102015222573.9 filed Nov. 16, 2015 and DE102015225615.4 filed Dec. 17, 2015, the entire disclosures of which are incorporated by reference herein.

TECHNICAL FIELD

The disclosure relates to a friction clutch having a rotational axis for the releasable transmission of a torque between a first drive unit and a second drive unit, to a hybrid module for a drive train, and to a drive train, e.g., for a motor vehicle.

The disclosure relates to a friction clutch having a rotational axis for the releasable transmission of a torque between a first drive unit and a second drive unit, the friction clutch having at least the following components:

a friction package;

a first actuating element which is set up to press the friction package in a first axial actuating direction in the engaged state. Above all, the friction clutch is characterized in that, furthermore, a second actuating element is provided which is arranged on that side of the friction package which lies opposite the first actuating element, and is set up to press the friction package in a second axial actuating direction in the engaged state, the second axial actuating direction being directed counter to the first axial actuating direction.

BACKGROUND

Hybrid drives having two drive units are known from the prior art, in which hybrid drives an internal combustion engine, with a greater range without fuel refilling, and an electric motor without exhaust gas emissions are usually provided. In one configuration, the electric motor is used as a traction motor, it being possible for the internal combustion engine to be switched in if required. In this configuration, the electric motor can advantageously be used as a starter for starting the internal combustion engine. In order to carry out an operation of this type, a friction clutch is provided between the two drive units. Here, the friction clutch is firstly to be capable of transmitting a high traction torque which is applied by way of the internal combustion engine, in a manner which is as low energy as possible, and is secondly to be capable of making a regulated overrun mode of the internal combustion engine possible. In this way, the conventional functions of the internal combustion engine can continue to be advantageously introduced into the hybrid drive.

Up to now, friction clutches are known, by means of which a torque can be transmitted releasably within a drive train. For the releasable transmission, the friction clutch has at least one friction package. The friction package has an axially displaceable pressing plate which is as a rule fixed rotationally to the output shaft and can be pressed against at least one corresponding friction disk. In many configurations, the friction package includes a pressing plate and a counterplate, the counterplate being fixed axially and being connected fixedly to the output shaft so as to rotate with it. A friction disk which is frequently configured as a friction plate is arranged and can be pressed between the pressing plate and the counterplate in this configuration. A friction force can therefore be applied on both sides to the friction disk, that is to say two friction pairings are formed. In another configuration, a plurality of friction disks, e.g., configured as friction plates, are provided with at least one additional intermediate plate, e.g., configured as friction plates. One intermediate plate may be arranged between in each case two friction disks. Just like the pressing plate, the at least one intermediate plate can be displaced axially and is connected fixedly to the output shaft so as to rotate with it. In one example configuration, the friction package is constructed as a multiple disk package, in which what are known as outer disks which are fixed rotationally in an outer basket and are mounted such that they can be displaced axially and what are known as inner disks which are fixed rotationally in an inner basket and are mounted such that they can be displaced axially are provided in an alternating manner. A pressing force is transmitted by an actuating element which acts on the multiple disk package from one side, with the result that a friction force is built up between the plurality of friction pairings. In the case of any configuration, the pressing force which can be exerted on the pressing plate results in a friction force via the friction face/faces which results, in a manner multiplied with the mean radius of the friction face/faces, in a torque which can be transmitted.

No conclusive concepts for the use and the actuation of a friction clutch which ensures smooth and individually mechanically limited torque transmission are known up to now.

BRIEF SUMMARY

The disclosure relates to a friction clutch having a rotational axis for the releasable transmission of a torque between a first drive unit and a second drive unit, the friction clutch having at least the following components:

a friction package having at least one friction plate and at least one corresponding friction disk for the transmission of a torque in the pressed state, it being possible for the at least one friction plate to be connected to a first drive unit, and it being possible for the at least one friction disk to be connected to a second drive unit;

a first actuating element which is set up to press the friction package in a first axial actuating direction in the engaged state. Above all, the friction clutch is characterized in that, furthermore, a second actuating element is provided which is arranged on that side of the friction package which lies opposite the first actuating element, and is set up to press the friction package in a second axial actuating direction in the engaged state, the second axial actuating direction being directed counter to the first axial actuating direction.

The friction clutch is set up to transmit a torque in a releasable manner from a first output shaft to a second output shaft. To this end, the friction clutch includes a friction package with at least one friction plate and with at least one corresponding friction disk. As described above, the pressing of the at least one friction plate with the at least one corresponding friction disk makes the transmission of a torque possible. The at least one friction disk may be connected in a hybrid drive to a first drive unit, and the at least one friction plate may be connected to a second drive unit. Here, the first drive unit may be an electric motor, and the second drive unit may be an internal combustion engine. The friction clutch can also be used in another configuration, however, the one drive unit can be set up to drive the respective other drive unit, for example to start it, to recuperate rotational energy or to mechanically store rotational energy.

Here, a torque can be transmitted from the first drive unit to the second drive unit in a manner which can be switched actively from the outside. To this end, the friction package is pressed together by means of a first actuating element. To this end, an external actuating force is transmitted to the friction package, for example by what is known as a concentric slave cylinder (CSC). The first actuating element bears against a friction plate of the friction package, for example a first end plate which is therefore arranged axially on the outer side on a first side. Here, the friction package is displaced overall in a first axial actuating direction against a stop and is thereupon pressed together. In this way, a torque can then be transmitted by means of the friction package from the first drive unit to the second drive unit.

In contrast to a friction package of a conventional friction clutch, a second actuating element is provided which is set up to displace said friction package in the opposite direction against a stop and to thereupon press it together. In one example embodiment, the actuating force of the first actuating element is then overcome, or the exertion of the actuating force by means of the first actuating element is canceled. As an alternative or in addition, the first actuating element forms the stop for the other actuating direction. It is advantageous in said friction clutch that a torque can be transmitted without interruption, for example, when the actuating force of the first actuating element is overcome and the friction package is displaced by the opposed actuating force of the second actuating element counter to the first actuating direction against the first stop. During this operation, at least the first actuating force prevails. The second actuating element may be set up to exert a greater (second) actuating force than the first actuating element.

An interruption-free transmission of a torque is made possible by means of said friction clutch, with the result that a smooth transition is possible from the prevailing torque of the first drive unit in a state of the friction clutch, in which it is pressed together by means of the first actuating element, to a torque of the second drive unit, which torque is as a rule greater. Here, the actuating elements can be actuated by means of respective associated power sources. As a result, in addition, the respective desired or required pressing force can be applied in a defined manner, for example by the actuating elements being able to transmit a (different) maximum pressing force, with the result that, in the case of a respective (different) excessive torque, the friction elements slip with respect to one another. In this way, the torque which can be transmitted is limited reliably for the respective drive unit.

In a further advantageous embodiment of the friction clutch, the first actuating element includes a pressing spring which is so soft that the maximum first pressing force is lower than the maximum second pressing force.

Said embodiment achieves a situation where a limit torque which is lower than a characteristic torque of a second drive unit at a setpoint rotational speed can be transmitted at most by means of the friction package in the state, in which it is pressed together by means of the first actuating element. Since the torque which can be transmitted is proportionally dependent on the pressing force, that is to say on the actuating force, the torque which can be transmitted can be limited by means of a limited actuating force.

In said embodiment, the first actuating element includes a pressing spring which is so soft that the pressing force is weaker than is necessary to transmit the characteristic torque by means of the friction package at a setpoint rotational speed of the second drive unit. The soft pressing spring therefore leads to it being possible for a limit torque to be transmitted, e.g., from the second drive unit to the first drive unit, when the friction package is pressed together by means of the first actuating element. If a torque of the second drive unit then prevails, which torque is greater than the limit torque, this leads to slip between the friction pairings.

A pressing force which is higher in this way in comparison with the first actuating element can, for example, be exerted by means of the second actuating element, with the result that a higher torque can therefore be transmitted. Here, the friction package can, for example, be operated without slip even in the case of a maximum torque. The main proportion of the torque can therefore be transmitted completely by means of the friction package in the state, in which it is pressed together by means of the second actuating element.

In a further advantageous embodiment of the friction clutch, in each case one spacing spring, for example, a corrugated washer, is provided between two adjacent friction plates and/or between two adjacent friction disks, in order to push the adjacent friction plates or friction disks axially apart from one another.

The at least one spacing spring in the friction package brings it about that the adjacent friction disks and/or the adjacent friction plates are pushed apart from one another when the actuating force is reduced to such an extent that a transmission of torque is to be interrupted. Here, the spacing spring assists release of the respective friction pairings and therefore ensures that the transmission is disconnected, or is at least reduced sufficiently. In each case one spacing spring may be provided between each of the adjacent friction disks and friction plates. Here, a spacing spring may be formed by a corrugated washer. The spacing force is overcome and the friction package is pressed together by means of the application of an actuating force of one of the two actuating elements.

In a further advantageous embodiment of the friction clutch, the friction package is formed as a multiple disk package, and the friction clutch has an outer basket and an inner basket, the friction plates being hooked in the outer basket such that they are fixed rotationally and can be displaced axially, and the friction disks being hooked in the inner basket such that they are fixed rotationally and can be displaced axially.

In said embodiment, the friction package is formed by way of a multiple disk package. The multiple disk package includes firstly at least one inner disk and secondly at least two outer disks, the inner disks forming the friction disks and the outer disks forming the friction plates. The inner disks can be connected to the first drive unit and the outer disks can be connected to the second drive unit and, when assembled in a drive train, are in each case connected fixedly in a torque-transmitting manner. Here, the two disk types can be displaced axially in associated baskets and are hooked in fixedly so as to rotate by means of a corresponding toothing system. The inner disks are hooked in the inner basket and the outer disks are hooked in the outer basket.

In a further advantageous embodiment of the friction clutch, the friction clutch has, furthermore, at least the following components:

a ball ramp apparatus having an actuating length which includes an outer ramp ring and an inner ramp ring, it being possible for the actuating length to be changed by means of a relative rotation of the inner ramp ring with respect to the outer ramp ring;

a freewheel, having an output side and an input side, the input side being connected to the inner ramp ring of the ball ramp apparatus, and the output side being connected to the at least one friction disk.

Here, the second actuating element is arranged between the friction package and the outer ramp ring of the ball ramp apparatus. In the case of a minimum actuating length of the ball ramp apparatus, the second actuating element is disengaged and, in the case of a maximum actuating length of the ball ramp apparatus, is engaged by means of the ball ramp apparatus. The freewheel is set up in such a way that, in the case of a greater ramp rotational speed of the inner ramp ring than a disk rotational speed of the at least one friction disk, a torque can be transmitted between the output side and the input side, for example, with an identical rotational speed, and, in the case of a smaller ramp rotational speed than a disk rotational speed, the output side and the input side are disconnected.

This configuration makes it possible for the friction package to be pressed together by means of the second actuating element, without an external energy supply being necessary for operation which is regulated according to the above stipulation with a transmission of traction torque and a transmission of overrun torque from the second drive unit.

The ball ramp apparatus is arranged between the second actuating element and the input side of the freewheel. Here, the outer ramp ring of the ball ramp apparatus is connected, possibly directly, to the second actuating element, and the inner ramp ring of the ball ramp apparatus is connected, possibly directly, to the input side of the freewheel. In a state, in which the freewheel is disconnected, the inner ramp ring runs freely and is driven by the outer ramp ring. A rotational speed which is different than the outer ramp ring can be forced onto the inner ramp ring when the freewheel blocks, that is to say transmits a torque. To this end, a torque which is directed counter to the outer ramp ring has to prevail on the output side of the freewheel. This is the case when the first drive unit is operated at a lower rotational speed than the second drive unit. In order to set this state, either the friction clutch has to be released, that is to say a transmission of torque has to be interrupted, or the friction clutch has to be operated with slip. The latter is an example operating state, the operation with slip, for example, being ensured mechanically by means of the softness of the first actuating element and therefore the limitation of the (first) pressing force.

The actuating length of the ball ramp device is changed by way of a resulting relative rotation of the inner ramp ring with respect to the outer ramp ring. As a consequence of a lengthening (or shortening in conjunction with a lever as actuating element) of the actuating length of the ball ramp apparatus, the second actuating element which is connected to the outer ramp ring is moved axially toward the friction package, possibly displaced, and therefore presses the friction package together. In one example embodiment, the (second) pressing force which is generated is greater than the (first) pressing force of the first actuating element, with the result that the friction package is pressed together in such a way that the torque which can be transmitted as described above is increased in said second pressed-together state in comparison with the first pressed-together state. In this state, the torque of the second drive unit can be transmitted completely via the friction clutch. Merely a small proportion of the torque is conducted to the ball ramp device and is converted into the second pressing force.

If, in contrast, the ball ramp device has its minimum (or maximum in the case of a lever as second actuating element) actuating length, the second actuating element is disengaged to a maximum extent. The friction package can then be pressed together by means of the first actuating element and is otherwise released.

The friction clutch according to said configuration can therefore be operated as follows in the case of a first drive unit as electric motor for the traction mode and a second drive unit as internal combustion engine. In the case of electric driving, in the case of coasting or in the case of recuperation, the friction clutch is released or open, and the internal combustion engine is not driven in a coupled manner. In order to generate an overrun torque, that is to say in order to start the internal combustion engine or to engage the engine brake, the friction package is actuated in an active manner by means of the first actuating element. As soon as the internal combustion engine is running and the electric motor is caught up with, the freewheel engages. The torque which is transmitted in the process is transmitted via the freewheel to the inner ramp ring and is converted in the ball ramp device into an axial pressing force. Here, the transmission of force to the friction package takes place via the second actuating element. In the case of said operation, the friction package is moved in the opposite second actuating direction until the friction package bears against the second stop. The friction clutch is then closed without the external supply of energy in the traction mode. If the internal combustion engine is no longer required, it can simply be switched off. As soon as the electric motor rotates more rapidly than the internal combustion engine, the friction clutch opens again automatically because the freewheel no longer engages and therefore the ball ramp device is no longer twisted.

In a further advantageous embodiment of the friction clutch, the inner ramp ring is supported on the outer basket by means of an axial bearing, for example, indirectly via a freewheel pot which is connected on the input side to the freewheel.

In said example embodiment, the inner ramp ring is mounted directly on the outer basket of the multiple disk package, the outer basket possibly being guided radially to the inside here, in order to form, radially on the inside, a direct attachment or an indirect attachment via a vibration damper and/or vibration absorber, to a second output shaft of a second drive unit. Here, the bearing may be an axial anti-friction bearing, for example, a needle bearing. Here, a particularly small amount of axial installation space is required with low friction. Independently of said bearing configuration, the radially inwardly guided section of the outer basket is set up as an (indirect) stop for the first actuating direction. In the indirect embodiment, in the pressed-together state by means of the first actuating element, the second actuating element (for example, a ramp-side pressure pot) is arranged between the multiple disk package and the outer basket.

The inner ramp ring of the ball ramp device may be connected to a freewheel pot. The freewheel pot is the link between the inner ramp ring of the ball ramp apparatus and the freewheel. For example, the freewheel pot has a freewheel toothing system (possibly formed in one piece) on the freewheel side, and is connected to the inner ramp ring on the ramp side. In one embodiment, the inner ramp ring is supported on the outer basket by means of the freewheel pot.

In a further advantageous embodiment of the friction clutch, a (ramp-side) pressure pot is arranged between the outer ramp ring and the friction package, which pressure pot is hooked in the outer basket such that it is fixed rotationally and can be displaced axially.

Said embodiment can be assembled particularly simply, by it being possible, just like the multiple disk package, for the ramp side pressure pot to be inserted into the outer basket for assembly. The pressure pot is permanently driven rotationally with the outer pot via a corresponding toothing system, the pressure pot at the same time being mounted such that it can be displaced axially. Furthermore, the pressure pot can be manufactured inexpensively even for small batches and large batches, for example as a deep-drawn part or by means of cold working. In one suitable embodiment, the pressure pot can be used as a first stop for the multiple disk package for pressing together by means of the first actuating element, which first stop is supported on the outer basket. A securing ring may be provided as the second stop for the multiple disk package for pressing together by means of the second actuating element, for example, the pressure pot which is described here, which securing ring is inserted radially, for example, clamped in, on the opposite side of the multiple disk package.

In a further advantageous embodiment of the friction clutch, the inner basket and the input side of the freewheel have in each case one through opening which can be aligned so as to be flush with respect to one another and/or so as to cover one another, through which through opening a screwing instrument can be guided, in order to screw the friction clutch to an output shaft of a first drive unit and/or a second drive unit.

Preassembled modules are increasingly being demanded by the customers, in particular the vehicle manufacturers. This also affords the advantage for the supplier that it can offer entire systems in one module which have already been assembled and tested by its own employees. However, this entails disadvantages in the assembly capability of the modules, in particular when a great compactness is required. It is then proposed here to provide through openings which are necessary for fastening the friction clutch. The through openings for a screwing instrument, which through openings can be aligned so as to be flush with respect to one another, are integrated into the freewheel pot and into the inner basket, and at the same time lead to a reduction in the mass of components which rotate and are accelerated during operation. By way of the flush through holes, the friction clutch can be screwed to an output shaft of a drive unit, for example, to the second output shaft of the second drive unit. The necessary bolts can likewise, for example, be guided through the through openings. The number of through openings over the circumference may be smaller than the number of screw connections, and/or the through openings are arranged in each case in an axially symmetrical manner.

According to an example aspect, a hybrid module for a drive train of a motor vehicle, for example, is proposed, which hybrid module has at least the following components:
a friction clutch according to one embodiment of the above description; and
a first drive unit which is an electric motor. Here, the electric drive unit is connected in a torque-transmitting manner to the at least one friction disk, and possibly to the output side of the freewheel.

The hybrid module already includes the electric motor with a friction clutch in one embodiment according to the above description. The hybrid module can, for example, be mounted as a preassembled and fully functional unit in a drive train. In one example embodiment, the friction clutch is integrated into the rotor of the electric motor, the rotor, for example, being configured as a rotor pot. The marriage of the second drive unit, e.g., an internal combustion engine, and the hybrid module may be possible via the above-described through openings.

Furthermore, the hybrid module may include a vibration damper, for example a dual mass flywheel, and/or a vibration absorber, for example a centrifugal force pendulum. The hybrid module can, for example, be mounted directly on a crankshaft of an internal combustion engine in a flush manner. On the output side, for example, the hybrid module can be attached to a transmission or directly to a consumer.

According to an example aspect, a drive train for a hybrid vehicle is proposed, which drive train has a second drive unit with a second output shaft, and a hybrid module. Here, the second drive unit can be driven via its second output shaft by means of the first drive unit when the friction package of the friction clutch is pressed together.

The drive train is set up to provide a torque which is output by the hybrid module and/or the second drive unit for at least one consumer in a releasable manner, that is to say such that it can be switched in and switched off. An exemplary consumer is at least one drive wheel of a motor vehicle and/or an electric storage device for storing and providing (for example, recuperated) electric energy. Conversely, capture of inertial energy which is introduced, for example, by a drive wheel can also be implemented. The inertial energy of the at least one drive wheel can be discharged by means of the friction clutch to the engine brake of the internal combustion engine and/or can be conducted to the electric motor which can be operated as an electric generator for recuperation, that is to say for electric storage of the braking energy. The drive train which is proposed here with the hybrid module can be assembled simply and, in a compact installation space, meets the complex requirements of the usability of the functions of the two drive units. Moreover, in one example embodiment, the coupling of the second drive unit which has just been started, the internal combustion engine, or the coupling for utilizing the engine brake is configured in a mechanically coupled manner without an external energy supply and without an input which is controlled from the outside.

According to an example aspect, a hybrid vehicle is proposed which has at least one drive wheel which can be driven by means of a drive train according to the above description.

Most motor vehicles nowadays have front wheel drive and therefore may arrange the drive unit in front of the driver's cab and transversely with respect to the main driving direction. The installation space is particularly small precisely in the case of an arrangement of this type, and it is therefore particularly advantageous to use a hybrid module with a small overall size.

This situation is exacerbated in the case of passenger motor vehicles of the small car category in accordance with European classification. The functional units which are used in a passenger motor vehicle of the small car category are not substantially smaller in comparison with passenger motor vehicles of larger car classes. Nevertheless, the available installation space is substantially smaller in the case of small cars. The above-described drive train has a hybrid module with a small overall size. At the same time, all the advantages of the internal combustion engine and all the advantages of the electric motor can be utilized, by smooth coupling during switching in of the internal combustion engine being mechanically regulated. The internal combustion engine which has been started is switched in in a mechanically coupled manner when the operating rotational speed is reached, without it being necessary for external energy to be fed in to this end or for an external input to be performed.

Passenger motor vehicles are assigned to a vehicle class according to, for example, size, price, weight and performance, this definition being subject to a constant change according to the requirements of the market. In the US market, vehicles of the small car and very small car classes according to European classification are assigned to the class of the sub-compact car, and they correspond to the class of supermini or the class of city car in the British market. Examples of the very small car class are a Volkswagen up! or a Renault Twingo. Examples of the small car class are an Alfa Romeo Mito, Volkswagen Polo, Ford Fiesta or Renault Clio.

BRIEF DESCRIPTION OF THE DRAWINGS

The above-described embodiments will be explained in detail in the following text against the relevant technical background with reference to the associated drawings which show example refinements. The disclosure is not restricted in any way by the purely diagrammatic drawings; it is to be noted that the drawings are not to scale and are not suitable for defining proportions. In the drawings.

DETAILED DESCRIPTION

Figure 1:
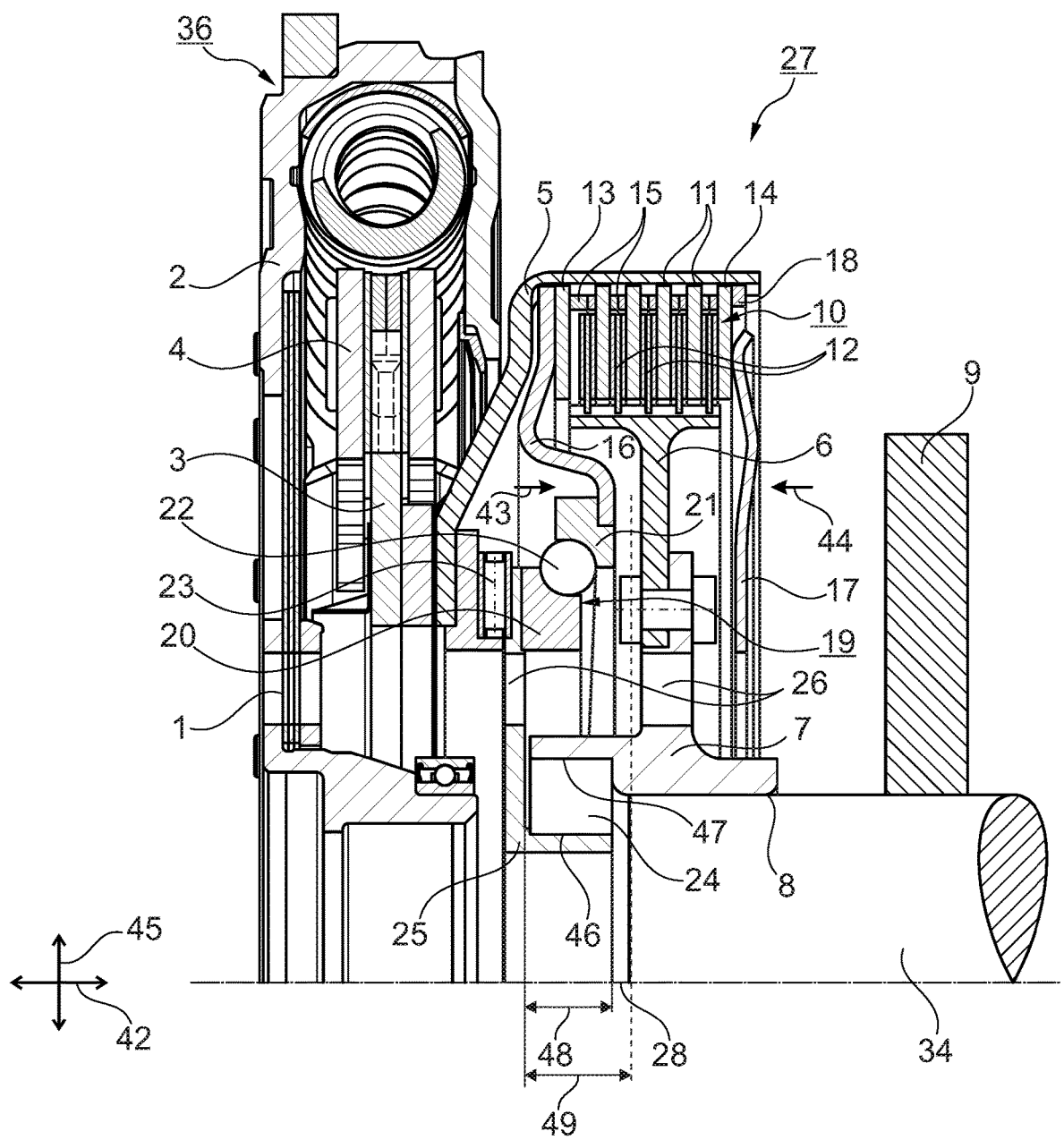
FIG. 1 shows a sectional view of one exemplary embodiment of the friction clutch.
Figure 2:
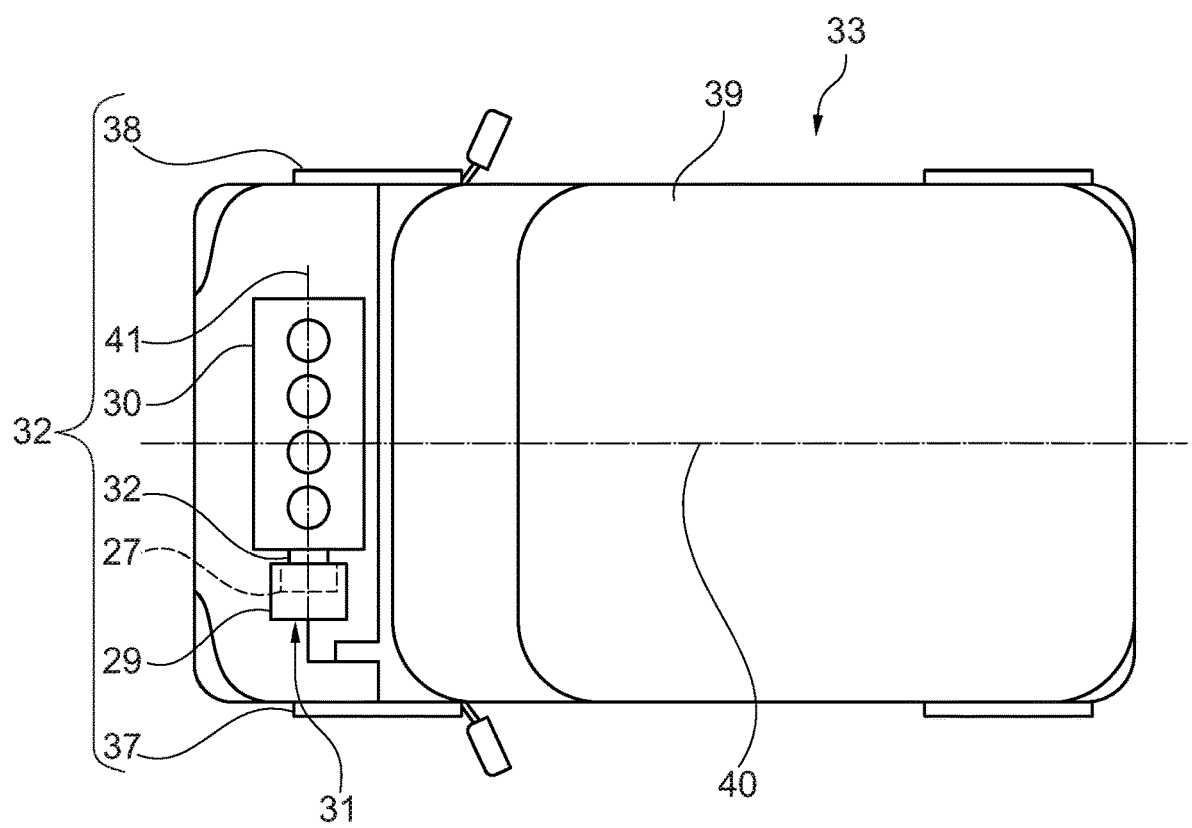
FIG. 2 shows a drive train in a motor vehicle with a friction clutch.

FIG. 1 relates to one exemplary embodiment of an assembly of a dual mass flywheel, a friction clutch 27 for coupling and decoupling an internal combustion engine (second drive unit 30) to and from a drive train of a hybrid vehicle 33, and an electric machine (first drive unit 29), also called an electric motor or electric traction motor. The drive units 29 and 30 are shown in FIG. 2. Features which are not characterized as being essential to the present description are to be understood to be optional. Therefore, the following description also relates to further exemplary embodiments of the drive train, for example of a hybrid vehicle 33, which have part combinations of the features which will be explained in the following text. In particular, the following description relates to exemplary embodiments of the friction clutch 27.

A primary side 2 of a dual mass flywheel 36 is provided on the input side of the detail (shown in FIG. 1) of a drive train 32 (cf. FIG. 2) of a hybrid vehicle 33 with a fastening 1 for attaching to a crankshaft of an internal combustion engine (not shown) which forms the second drive unit 30. A secondary side 3 of the dual mass flywheel 36 has a centrifugal force pendulum 4. Together with the drive train 32, the friction clutch 27 is mounted rotatably about a rotational axis (D), also called an axis of rotation 28. The secondary side 3 of the dual mass flywheel 36 is connected to an outer basket 5 of the friction clutch 27.

The friction clutch 27 is configured for coupling and decoupling the internal combustion engine 30 to and from the drive train 32 of the hybrid vehicle 33, and is also called a K0 clutch. Here, the friction clutch 27 is configured as a dry multiple disk clutch and can be engaged by means of an external actuator device (not shown), for example a concentric slave cylinder (CSC), in overrun mode for starting the internal combustion engine 30 or for the utilization of the engine brake. In addition to the outer basket 5, the friction clutch 27 has an inner basket 6 which is arranged within the outer basket 5 in the radial direction 45 (R) of the friction clutch 27, and a friction pairing 10 which is arranged between the outer basket 5 and the inner basket 6. In the engaged state, a torque can be transmitted from the outer basket 5 to the inner basket 6 by way of the friction pairing 10. Furthermore, the friction clutch 27 has a second actuating element (here, a first pressure pot 16), by way of which the friction pairing 10 can be engaged in the axial direction 42 (A) of the friction clutch 27 in a second actuating direction 43 (B1), and a first actuating element (here, a second pressure pot 17), by means of which the friction pairing 10 can be engaged in a first actuating direction 44 (B2) which is directed counter to the second actuating direction 43.

The first pressure pot 16 is operatively connected to a ball ramp device 19, by way of which part of a torque which prevails on an output side of the friction clutch 27 can be converted into a (second) pressing force which acts in the second actuating direction 43 (B1).

The second pressure pot 17 can be actuated radially on the inside by way of the abovementioned actuator device (not shown) in the first actuating direction 44 (B2), in order for it to be possible to engage the friction pairing 10 independently of the first pressure pot 16. The first pressure pot 16 is also likewise capable of engaging the friction pairing 10 independently of the second pressure pot 17.

The ball ramp device 19 is arranged in the radial direction 45 (R) and/or in the axial direction 42 (A) within the friction clutch 27, for example, within the outer basket 5 and/or within the friction pairing 10. Furthermore, the ball ramp device 19 is supported here in the axial direction 42 (A) via an axial bearing 23 such that it can be rotated on the outer basket 5. The ball ramp device 19 has at least one outer ramp ring 21 which is attached on the first pressure pot 16, and at least one inner ramp ring 20 which is supported indirectly or directly on the axial bearing 23. Balls 22 are, for example, arranged between the inner ramp ring 20 and the outer ramp ring 21 in the circumferential direction of the friction clutch 27.

A freewheel 24 is arranged in the radial direction 45 (R) within the inner basket 6, by which freewheel 24 the torque can be transmitted in a rotational direction to the ball ramp device 19, for example, via a freewheel pot 25, in order to engage the friction pairing 10 in the first actuating direction 43. The inner ramp ring 20 is supported via the freewheel pot 25 on the axial bearing 23. An outer ring (that is to say, the output side) of the freewheel 24 is arranged fixedly in a hub 7 so as to rotate with it, which hub 7 is connected fixedly to the inner basket 6 as to rotate with it or is configured in one piece with the inner basket 6. As an alternative, the inner basket 6 can also be configured in one piece with the hub 7. The hub 7 can be connected to a first output shaft 34 of the first drive unit 29, for example, via a spline toothing system 8.

The freewheel pot 25 and/or the hub 7 have/has at least one screw opening 26 which extends in the axial direction 42 (A) and is configured to make the screw connection possible of the outer basket 5 or a component which is connected to the outer basket 5, for example the dual mass flywheel 36, that is to say the primary side to of the dual mass flywheel 36, to a second output shaft of a second drive unit 30, for example a crankshaft of an internal combustion engine. Here, that detail of the assembly which is shown can be connected to the second output shaft in a manner which is preassembled in this way.

The friction pairing 10 can have dry-running outer disks 11 and inner disks 12 which alternate in the axial direction 42. Of the outer disks 11 and the inner disks 12, a first end disk 13 is in contact with the first pressure pot 16, and a second end disk 14 which lies opposite the first end disk 13 in the axial direction 42 is in contact with the second pressure pot 17. The outer disks 11, including the two end disks 13 and 14 in the exemplary embodiment which is shown, are fastened fixedly to the outer basket 5 so as to rotate with it, whereas the inner disks 14 are fastened fixedly to the inner basket 6 so as to rotate with it, in each case spline toothing systems being used, for example. Moreover, the outer disks 11 and/or the inner disks 12 can be moved in the axial direction 42 (A) by way of the pressure pots 16 and 17. The first pressure pot 16 is arranged in the axial direction 42 (A) between the outer basket 5 and the first end disk 13.

In each case at least one corrugated washer 15 is arranged between adjacent outer disks 11 and/or between adjacent inner disks 12, which corrugated washer 15 has a corresponding prestress, in order to disconnect the disks 11 and 12 in the case of a disengaged friction pairing 10. A securing ring 18 is set up to bear against the second end disk 14 and secures the disks 11 and 12, in particular the outer disks 11 to the open side of the outer basket 5.

A rotor 9 of an electric machine or an electric motor 29 is connected fixedly to the first output shaft 34 so as to rotate with it, which first output shaft 34 is plugged into the spline toothing system 8 of the hub 7. Therefore, the rotor 9 is connected fixedly to the inner basket 6 so as to rotate with it. Furthermore, the first output shaft 34 can be configured as a transmission input shaft or can be connected to a torque converter or a start-up clutch (single clutch or double clutch).

The electric machine 29 or the electric motor may be configured as an electric traction motor which can be operated not only in a driving mode, but rather also in a generator mode.

Although this is not shown, it is advantageous if the friction clutch 27 is received in the radial direction 45 (R) and/or in the axial direction 42 (A) at least partially within the rotor 9, for example by the rotor 9 being of pot-shaped configuration and extending, in relation to FIG. 1, in the radial direction 45 (R) outside the outer basket 5 (to the right in the illustration) in the direction of the dual mass flywheel 36. It is possible as a result to reduce the axial installation space.

In the case of electric driving, coasting or recuperation, the friction clutch 27 is disengaged and the internal combustion engine 30 is not driven in a coupled manner. In order to reduce the drag torque to a minimum, the multiple disks 11 and 12 are spaced apart uniformly by way of the corrugated washers 15.

In order to generate an overrun torque (internal combustion engine start/engine brake), the multiple disks 11 and 12 are actuated directly via the second pressure pot 17 by means of an input from the outside and by means of external energy, and are pressed to the left in relation to FIG. 1. Here, the second pressure pot 17 has a certain softness, in order for it to be possible to adjust the pressing force and therefore the torque cleanly.

When the internal combustion engine is running and catches up with the electric traction motor (the rotational speed of the internal combustion engine and the rotational speed of the electric traction motor are identical), the freewheel 24 engages, by way of which part of the torque is transmitted to the inner ramp 20 of the ball ramp device 19. This results in a relative rotation of the ramp rings 20 and 21 with respect to one another, that is to say twisting of the ball ramp device 19.

By way of the relative rotation of the ball ramp device 19, its (minimum) actuating length 48 is increased to a (maximum) actuating length 49 and an axial force is generated, by way of which the friction clutch 27 remains permanently closed in the traction mode of the internal combustion engine 30. During this operation, the multiple disks 11 and 12 are moved to the right in relation to FIG. 1, until the second end disk 14 is present at the securing ring 18. The friction clutch 27 is therefore closed without energy in the traction mode.

If the internal combustion engine 30 is no longer required, the fuel supply is interrupted, for example. As soon as the rotational speed of the internal combustion engine 30 is lower than the rotational speed of the electric traction motor 29, the friction clutch 27 opens automatically, corrugated washers 15 which are arranged between the multiple disks 11 and 12 pressing the individual multiple disks 11 and 12 apart from one another and in the process rotating the ball ramp device 19 back into its relative starting position, with the result that there is again a minimum actuating length 48.

During electric driving, coasting and recuperation, the K0 clutch is disengaged, in order for it not to be necessary to drive the internal combustion engine in a coupled manner.

It is an advantage in the case of said arrangement that, during the transition from the overrun mode into the traction mode, the friction clutch 27 does not open, but rather merely a movement of the multiple disks 11 and 12 (from the left to the right in FIG. 1) takes place.

The preceding exemplary embodiments relate to a K0 clutch which is integrated into the rotor and can be actuated via an actuator device (electrically, hydraulically or pneumatically) in order to generate an overrun torque. In the traction mode, the transmission of torque takes place without energy via the freewheel 24 which is configured as a pilot control element of the ball ramp device 19. The main torque is transmitted via the friction pairing 10.

FIG. 2 shows a drive train 32 in a hybrid vehicle 33. The drive train has a first drive unit 29, e.g., an electric motor which is set up as a traction motor, and a second drive unit 30, e.g., an internal combustion engine, which drive units can be operated in each case individually or in series. To this end, a friction clutch 27 is arranged between the two drive units 29 and 30, for example, as described above. This entire drive unit is connected in a torque-transmitting manner to a left-hand drive wheel 37 and a right-hand drive wheel 38, the connection being shown diagrammatically here and necessary intermediate elements not being shown. The drive unit is arranged in front of the driver's cab 39 with the motor/engine axis 41 transversely with respect to the longitudinal axis 40.

Advantageous interaction of an internal combustion engine and an electric motor is ensured mechanically by way of the friction clutch which is proposed here for a hybrid module.

According to the disclosure, the following embodiments are proposed, furthermore:

1. A friction clutch (27) for coupling and decoupling an internal combustion engine to and from a drive train of a hybrid vehicle, having an outer basket (5) and an inner basket (6) which is arranged within the outer basket (5) in the radial direction (R) of the friction clutch (27), and a friction pairing (10) which is arranged between the outer basket (5) and the inner basket (6), and by way of which friction pairing (10) a torque can be transmitted from the outer basket (5) to the inner basket (6) in the engaged state, the friction clutch (27) having a first pressure pot (16), by way of which the friction pairing (10) can be engaged in the axial direction (A) of the friction clutch (27) in a first actuating direction (B1), and the friction clutch (27) having a second pressure pot (17), by way of which the friction pairing (10) can be engaged in a second actuating direction (B2) which is directed counter to the first actuating direction (B1).

2. The friction clutch (27) as described in embodiment 1, the first pressure pot (16) being operatively connected to a ball ramp device (19), by way of which a torque which prevails on an output side of the friction clutch (27) can be converted into a force which acts in the first actuating direction (B1).

3. The friction clutch (27) as described in embodiment 2, the ball ramp device (19) being arranged in the radial direction (R) and/or in the axial direction (A) within the friction clutch (27), for example, within the outer basket (5) and/or within the friction pairing (10).

4. The friction clutch (27) as described in embodiment 2 or 3, the ball ramp device (19) being supported in the axial direction (A) via an axial bearing (23) rotatably on the outer basket (5).

5. The friction clutch (27) as described in embodiment 4, the ball ramp device (19) having at least one (possibly annular) outer ramp (21) which is attached on the first pressure pot (16), and at least one (possibly annular) inner ramp (20) which is supported indirectly or directly on the axial bearing (23).

6. The friction clutch (27) as described in one of embodiments 2 to 5, a freewheel (24) being arranged in the radial direction (R) within the inner basket (6), via which freewheel (24) the torque can be transmitted in a rotational direction to the ball ramp device (19), for example, via a freewheel pot (25), in order to engage the friction pairing (10) in the first actuating direction (B1).

7. The friction clutch (27) as described in embodiments 5 and 6, the inner ramp (20) being supported via the freewheel pot (25) on the axial bearing (23).

8. The friction clutch (27) as described in embodiment 6 or 7, an outer ring of the freewheel (24) being arranged fixedly in a hub (7) so as to rotate with it, which hub (7) is connected fixedly to the inner basket (6) so as to rotate with it or is configured in one piece with the inner basket (6), or being configured in one piece with the hub (7), and it being possible for the hub (7) to be connected to an output shaft.

9. The friction clutch (27) as described in one of embodiment 6 to 8, the freewheel pot (25) and/or the hub (7) having at least one screw opening (26) which extends in the axial direction (A) and is configured to make the screw connection possible of the outer basket (5) or a component which is connected to the outer basket (5), for example a dual mass flywheel, to a crankshaft of the internal combustion engine.

10. The friction clutch (27) as described in one of embodiments 1 to 9, the friction pairing (10) having, for example, dry-running outer disks (11) and inner disks (12) which alternate in the axial direction (A) and of which a first end disk (13) is in contact with the first pressure pot (16), and of which a second end disk (14) which lies opposite the first end disk (13) in the axial direction (A) is in contact with the second pressure pot (17), and the outer disks (11), for example, being fastened fixedly to the outer basket (5) so as to rotate with it, and the inner disks (14) being fastened fixedly to the inner basket (6) so as to rotate with it.

11. The friction clutch (27) as described in embodiment 10, in each case at least one corrugated washer (15) being arranged between adjacent outer disks (11) and/or between adjacent inner disks (12), which corrugated washer (15) is configured to disconnect the multiple disks (11, 12) in the case of a disengaged friction pairing (10).

12. The friction clutch (27) as described in embodiment 10 or 11, the first pressure pot (16) being arranged in the axial direction (A) between the outer basket (5) and the first end disk (13).

13. An assembly of a friction clutch (27) as described in one of embodiments 1 to 12 and an electric machine which may be configured as an electric traction motor which, in particular, can, for example, be operated not only in a traction mode, but rather also in a generator mode, the electric machine having a rotor (9) which is connected fixedly to the inner basket (6) so as to rotate with it, and the friction clutch (27), for example, being received in the radial direction (R) and/or in the axial direction (A) at least partially within the rotor (9).

LIST OF REFERENCE NUMERALS

1 Fastening for crankshaft of an internal combustion engine
2 Primary side of the dual mass flywheel
3 Secondary side of the dual mass flywheel
4 Centrifugal force pendulum
5 Outer basket of the K0 clutch
6 Inner basket of the K0 clutch
7 Hub
8 Spline toothing system for a first output shaft
9 Rotor of an electric traction motor
10 Friction pairing
11 Friction plate or outer disk
12 Friction plate or inner disk
13 Ramp-side or first end disk
14 Actuation-side or second end disk
15 Corrugated washer
16 Second actuating element or first pressure pot
17 First actuating element or second pressure pot
18 Securing ring
19 Ball ramp device
20 Inner ramp ring
21 Outer ramp ring
22 Ball
23 Axial bearing
24 Freewheel
25 Output side or freewheel pot
26 Through opening
27 Friction clutch
28 Rotational axis or rotary axis (D)
29 First drive unit (electric motor)
30 Second drive unit (internal combustion engine)
31 Hybrid module
32 Drive train
33 Hybrid vehicle
34 First output shaft
36 Dual mass flywheel
37 Left hand drive wheel
38 Right hand drive wheel
39 Driver's cab
40 Longitudinal axis
41 Engine axis
42 Axial direction (A)
43 Second actuating direction, ball ramp device (B1)
44 First actuating direction, actuator device (B2)
45 Radial direction (R)
46 Input side of the freewheel 47 Output side of the freewheel
48 Minimum actuating length of the ball ramp device
49 Maximum actuating length of the ball ramp device

The invention claimed is:

1. A friction clutch for releasable transmission of a torque between a first drive unit and a second drive unit, comprising:
- a rotational axis;
- a ball ramp apparatus comprising:
  - an outer ramp ring;
  - an inner ramp ring; and,
  - an actuating length, adjustable by a relative rotation of the inner ramp ring with respect to the outer ramp ring to achieve a minimum actuating length and a maximum actuating length;
- a friction package for transmitting the torque in a pressed state, comprising
  - at least one friction plate; and,
  - at least one friction disk, a one of the at least one friction plate or the at least one friction disk arranged for connection to the first drive unit, and the other of the at least one friction plate or the at least one friction disk arranged for connection to the second drive unit;
- a first actuating element arranged on a first side of the friction package for pressing the friction package in a first axial actuating direction to achieve the pressed state; and,
- a second actuating element arranged on a second side of the friction package, opposite the first side, between the friction package and the outer ramp ring, for pressing the friction package in a second axial actuating direction, opposite the first axial actuating direction, to achieve the pressed state when the ball ramp apparatus is at the maximum actuating length; and,
- a freewheel arranged to transmit the torque when the inner ramp ring is rotated faster than the at least one friction disk, and be disconnected when the inner ramp ring is rotated slower than the at least one friction disk, the freewheel comprising:
  - an input side connected to the inner ramp ring of the ball ramp apparatus; and,
  - an output side connected to the at least one friction disk.

2. The friction clutch of claim 1 wherein:
the first actuating element comprises a pressing spring arranged such that a first maximum pressing force of the first actuating element is less than a second maximum pressing force of the second actuating element.

3. The friction clutch of claim 1, further comprising a spacing spring, wherein:
the at least one friction plate comprises a first friction plate and a second friction plate, adjacent to the first friction plate, and the spacing spring is disposed between the first friction plate and the second friction plate for pushing the first friction plate and the second friction plate axially apart from one another; or,
the at least one friction disk comprises a first friction disk and a second friction disk, and the spacing spring is disposed between the first friction disk and the second friction disk for pushing the first friction disk and the second friction disk axially apart.

4. The friction clutch of claim 3 wherein the spacing spring is formed as a corrugated washer.

5. The friction clutch of claim 3 further comprising an outer basket and an inner basket, wherein:
the at least one friction plate is hooked in the outer basket and arranged to be fixed rotationally and displaced axially; and,
the at least one friction disk is hooked on the inner basket and arranged to be fixed rotationally and displaced axially.

6. The friction clutch of claim 5, further comprising an axial bearing on the outer basket, wherein:
the freewheel comprises a freewheel pot on the input side; and,
the inner ramp ring is indirectly supported on the axial bearing by the freewheel pot.

7. The friction clutch of claim 5 wherein the second actuating element comprises a pressure pot arranged between the outer ramp ring and the friction package, the pressure pot being hooked in the outer basket and arranged to be fixed rotationally and displaced axially.

8. The friction clutch of claim 5, wherein:
the inner basket comprises a first through opening and the input side comprises a second through opening;
the first through opening and the second through opening can be aligned so as to be flush with respect to one another or so as to cover one another; and,
when aligned to be flush, the first through opening and the second through opening are arranged to guide a screwing instrument so that the friction clutch can be screwed to an output shaft of the first drive unit or the second drive unit.

9. A hybrid module for a drive train, comprising:
the friction clutch of claim 1, wherein the first drive unit is an electric motor.

10. The hybrid module of claim 9, further comprising the second drive unit, wherein the first drive unit is arranged to provide the torque to the second drive unit when the friction package is in the pressed state.

11. The hybrid module of claim 9 wherein the at least one friction disk is connected to the first drive unit.

12. A hybrid module for a drive train, comprising:
the friction clutch of claim 1, wherein the first drive unit is an electric motor connected to the output side of the freewheel.

* * * * *